United States Patent

Howell

[15] 3,701,094

[45] Oct. 24, 1972

[54] ERROR CONTROL ARRANGEMENT FOR INFORMATION COMPARISON

[72] Inventor: Thomas H. Howell, Scottsdale, Ariz.

[73] Assignee: Honeywell Information Systems Inc., Waltham, Mass.

[22] Filed: April 19, 1971

[21] Appl. No.: 134,941

[52] U.S. Cl. ....................340/146.1 AL

[51] Int. Cl. ....................G06f 11/12

[58] Field of Search ........340/146.1, 173 AM, 172.5; 235/153

[56] References Cited

UNITED STATES PATENTS

| | | | |
|---|---|---|---|
| 3,444,522 | 5/1969 | Polhemus | 340/146.1 |
| 3,521,238 | 7/1970 | Gunderson | 340/172.5 |
| 3,533,085 | 10/1970 | Murphy | 340/173 |
| 3,585,607 | 6/1971 | De Haan, et al. | 340/173 |

*Primary Examiner*—Charles E. Atkinson

*Attorney*—Fred Jacob and Edward W. Hughes

[57] ABSTRACT

A data key word, encoded in a certain error correcting code, is read from a storage device, the information portions thereof are compared to a master key word, and the outcome of the comparison is recorded. The data key word, if in error, is also decoded to obtain an error pattern word and an error location indication. From the above information, it is determined whether the data key word is greater than, equal to, or less than the master key word. Error protection is provided for the data key word without the necessity of buffering or actually correcting the data key word.

8 Claims, 2 Drawing Figures

INVENTOR
T. H. HOWELL
BY Edward W. Hughes
ATTORNEY

ERROR CONTROL ARRANGEMENT FOR INFORMATION COMPARISON

BACKGROUND OF THE INVENTION

The invention relates to information comparison and more particularly to an error control method and apparatus for use in information comparison.

Information comparison is utilized in a variety of environments and for a variety of purposes. One such use is in associative information storage and retrieval in which a desired location in storage is selected by comparing or "associating" certain of the stored information, known as data keys, with retrieval or master keys. The occurrence of a match between a data key and a master key identifies that information in storage which is associated with the matching data key either as the information desired for retrieval or as information to be replaced by storing information thereover.

Another use of information comparison is in data sorting in which a set of information items are arranged in a uniform sequence as determined by the magnitudes of the individual items. In order to perform the arranging, it is usually necessary to perform a number of comparisons of the information items. Sorting, of course, is one of the basic data processing functions and is, in turn, used in a variety of applications.

No matter how information comparison is used, it is desirable to provide some type of error control for the information compared. This is especially true if the information, or at least part of the information, compared is retrieved from a storage media subject to errors, such as a disc or drum memory. For example, error control of the stored information in associative storage and retrieval is desirable since the accuracy of the stored information is important not only to the end use of any retrieved information but also in determining the location of the desired information. That is, an error in the stored information could result in the wrong information being located or in failure to locate the proper information. (Hereafter, when discussing information comparison generally, it will be assumed that a data key is to be compared with a master key and that the data key is read from a storage device subject to errors and thus requires some type of error control.)

One method of providing error control for information comparison is to encode the data key in accordance with some error correcting code prior to storage thereof in the storage device. Then, when it is desired to compare the data keys with a master key, the encoded data keys are read from the storage device, corrected in accordance with the error correcting code, and compared with the master key. With this method, the data keys read from the storage device must be buffered or temporarily stored while the correction of the keys is being carried out. This, of course, adds expense to the comparison operation.

SUMMARY OF THE INVENTION

It is an object of the present invention to provide an efficient and economical error control arrangement for information comparison.

It is another object of the present invention to provide such an error control arrangement which does not require buffering of data keys retrieved from the storage device.

It is still another object of the present invention to provide such an error control arrangement wherein no error correction of the retrieved data keys is required prior to comparing the data keys to a master key.

These and other objects and features of the present invention are realized in a specific illustrative embodiment in which data key words, having been encoded in an m-digit-burst error correcting code, are read from a storage device and the information portion thereof compared with a master key word. Mismatch indications are stored for the most significant digit position $P_1$ in which the words differ and for all digit positions of the next M–1 positions (reading in descending order of significance) in which the words differ. Also, an indication is stored as to which digit in position $P_1$ is greater (such indication being referred to as $R_1$). An indication is also stored as to which digit is greater in the position next following the $P_1+M-1$ digit position having differing digits (such indication being referred to as $R_2$). If no error has occurred in the data key word or if the first erroneous digit position of the data key word follows $P_1$ (again reading in descending order of significance), then $R_1$ will give the overall word comparison result. If the first erroneous digit position of the data key word precedes $P_1$ or if there is an error but no detected difference, then the digit in the master key word corresponding in position to the first erroneous digit position of the key data word will provide the overall word comparison result, sic the master key word is greater if this digit is "1" and lesser if the digit is "0." Finally, if the first erroneous digit position of the data key word corresponds to $P_1$, then the digit in the master key word corresponding to the next erroneous digit position of the data key word not having differing digits or corresponding to the next position having differing digits but not being in error will provide the overall word comparison result. If the first erroneous digit position of the data key word corresponds to $P_1$, but the remaining erroneous digit positions also have differing digits and all differing positions of the next M–1 positions following $P_1$ are erroneous, then $R_2$ will give the word comparison result.

With the above arrangement, error protection is provided for the comparison operation without the necessity of buffering or actually correcting the data key words.

BRIEF DESCRIPTION OF THE DRAWINGS

A complete understanding of the present invention and of the above and other objects and advantages thereof may be gained from a consideration of the following detailed description presented in connection with the accompanying drawings which are described as follows.

DETAILED DESCRIPTION

Before describing the apparatus of FIGS. 1A and 1B, a brief discussion of burst error correcting codes will be given.

Digital data is most often represented or coded in sequences of binary signals (hereafter referred to as bits). Each position in any sequence or code word consists of a bit "0" or "1", the different code word permutation of bits representing different items of information. Errors occur in code words when a bit or bits are changed from a value "0" to a value "1," or vice versa. (So-called erasure errors where it is not possible to determine the value of erroneous bits are not of concern here.) The underlying object in utilizing burst error correcting codes (or any error correcting code for that matter) is to be able to decode an erroneous word and obtain the original and correct version of the word.

Error correcting codes may be generally divided into two classes — random error correcting codes and burst error correcting codes. A random error correcting code is one which is constructed to deal primarily with errors which occur randomly (i.e., independently of other errors) throughout the data in question. Burst error correcting codes, on the other hand, are those constructed to deal primarily with errors which occur in bunches or bursts throughout the data. For a general discussion of random and burst error correcting codes, see Peterson, W.W., Error-Correcting Codes, the MIT Press, 1961.

Decoding burst error correcting codes, such as the Fire codes described in the aforecited Peterson text, pages 189–195, may be accomplished by feedback shift register circuitry as shown in the Peterson text. Such decoding of an $m$-bit-burst error correcting code normally includes processing each $n>m$ bit code word to obtain an $m$ bit error pattern word and an error location indication which identifies the first bit of a span of bits in the code word to which the error pattern word will be added (module 2) to correct any erroneous bits.

Figure 1A:
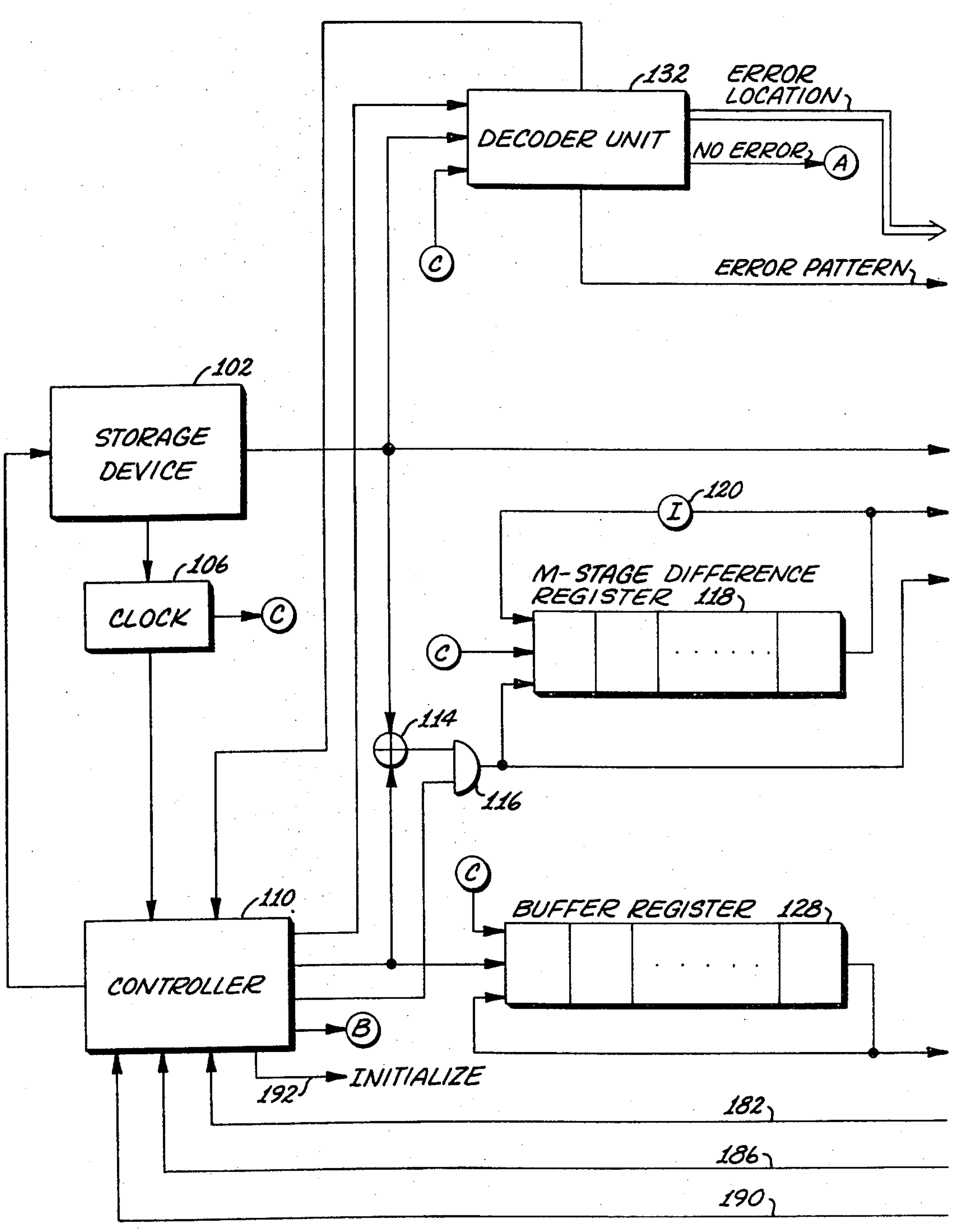
FIGS. 1A and 1B, with FIG. 1A positioned to the left of FIG. 1B, show an arrangement for providing burst error control for information comparison in accordance with the present invention.
Figure 1B:
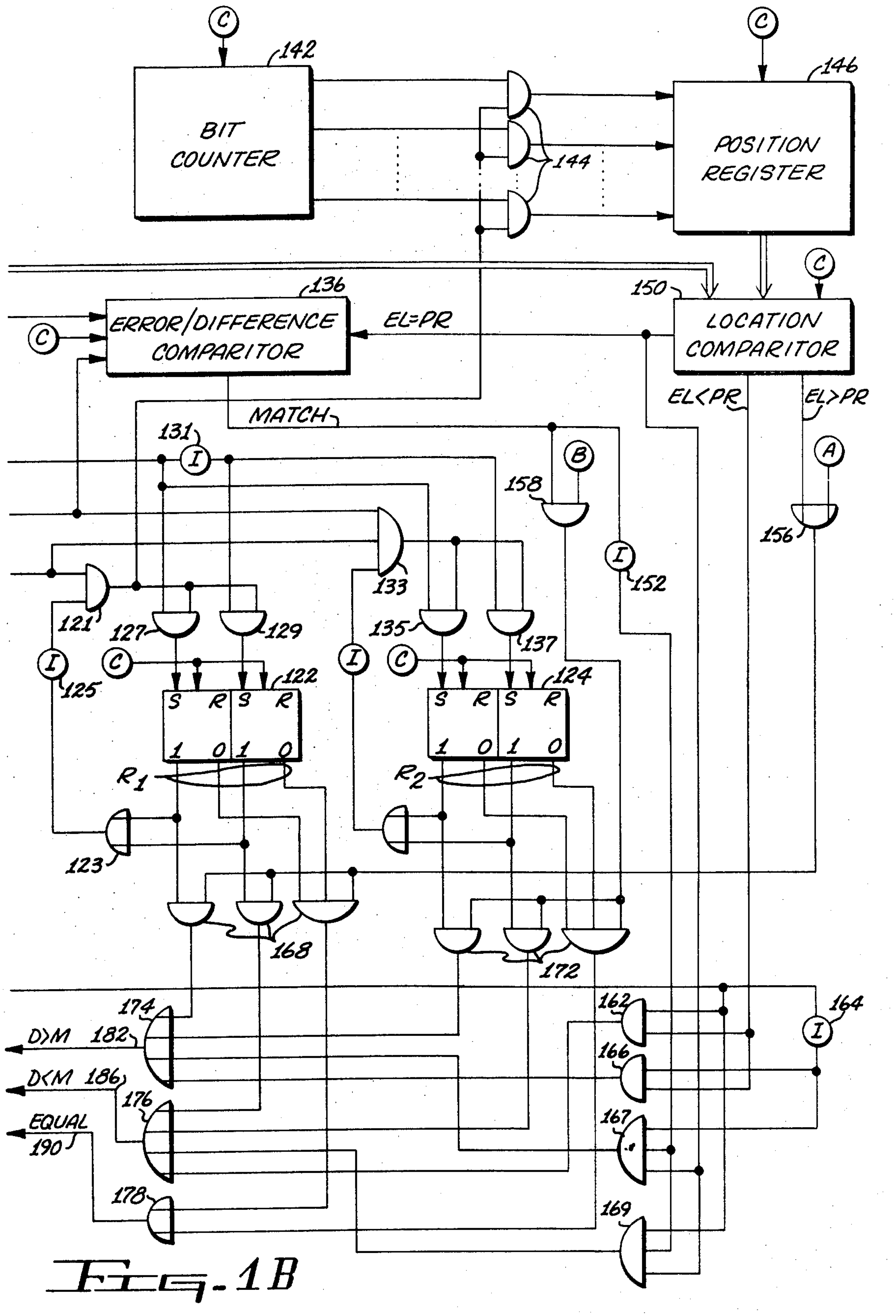

The illustrative apparatus of FIGS. 1A and 1B utilizes a burst error correcting code of the type described above having a capability of correcting error bursts of up to $m$ bits in length. The apparatus includes a storage device 102 for storing a plurality of data key words each encoded in an $m$-bit-burst error correcting code, a clock 106 for supplying clock pulses to the rest of the apparatus of FIGS. 1A and 1B thereby enabling the apparatus to operate in a synchronous mode, and a controller 110 for supplying a master key word with which the data key words will be compared and for generally controlling the operation of the FIGS. 1A and 1B apparatus. The general operation of the FIGS. 1A and 1B apparatus will first be described to illustrate the basic concepts of the present invention and then a more detailed description will be given.

The operations performed by the FIGS. 1A and 1B apparatus include a bit-by-bit comparison by an EXCLUSIVE-OR gate 114 of a data key word from the storage device 102 with a master key word from the controller 110 by the EXCLUSIVE-OR gate 114 (see FIG. 1A). The first bits of the words compared are the more significant bits. Indications of the most significant digit position $P_1$ in which the words differ and of those digit positions of the next M–1 positions (reading in descending order of significance) in which the words differ are recorded in an M-stage difference register 118. Also, the result $R_1$ of comparing the digits in position $P_1$ (i.e., whether the data key word digit in position $P_1$ is greater than the corresponding digit in the master key word or vice versa) is registered in flip-flops 122 of FIG. 1B. Further, the result $R_2$ of comparing the digits in the next digit position $P_2$ following the position $P_1 +$ M–1 in which the words differ is registered in flip-flops 124 of FIG. 1B.

In addition to applying the data key word and the master key word to the EXCLUSIVE-OR gate 114, the master key word is applied to and stored in a buffer register 128 and the data key word is applied to a decoder unit 132 for decoding. The decoder unit 132 decodes the data key word and, if the data key word is erroneous, generates therefor an error pattern word and an error location indication. From the information generated by the decoder unit 132 and from that stored in the difference register 118, the buffer register 128, and flip-flops 122 and 124, it is determined which of the following five possible conditions exist:

1. no error is detected in the data key word,
2. the first erroneous position in the data key word follows the position $P_1$ of the first detected difference between the data key word and the master key word,
3. the first erroneous position in the data key word precedes the position $P_1$ of the first detected difference between the data key word and the master key word,
4. an error is detected in the data key word but no differences between the data key word and the master key word are detected, and
5. the first erroneous position in the data key word coincides with the position in which the first difference between the data key word and the master key word was detected.

A determination of which of the five conditions exists, along with the information in register 128, the error pattern determined by the decoder unit 132, and flip-flops 122 and 124, provides all the information necessary to determine whether the data key word is greater than, equal to, or less than the master key word.

If it is determined that the first or second condition exists, then the contents of flip-flops 122 determines whether the data key word is greater than, equal to, or less than the master key word. This is because the first digit position $P_1$ in which the compared words differ is the most significant digit position of all positions in which the words differ. Thus, the result of comparing the digits of position $P_1$ (stored in flip-flops 122) determines the overall result of the word comparison. Of course, if the data key word and the master key word match, then no difference result will be stored in flip-flops 122 which provides the desired indication of a match.

If it is determined that the third or fourth condition exists, then the digit in the master key word (stored in the buffer register 128) corresponding in position to the first erroneous digit position of the data key word determines the outcome of the word comparison. Specifically, if this master key word digit is a "1," then, even though no difference was detected for this position, it is apparent that the corresponding digit of the data key word should be "0" since the corresponding digit was determined to be in error. Thus, a value of "1" for the master key word digit indicates that the master key word is greater than the data key word. Conversely, a value of "0" for the master key word digit in the position corresponding to the first erroneous digit position indicates that the data key word is greater than the master key word. Selection and utilization of this digit from the buffer register 128 will be discussed later.

Finally, if it is determined that the fifth condition exists, then it is necessary to examine the M–1 positions following $P_1$ to locate either the next position in error not having differing digits or the next position having differing digits but not being in error (assuming there is such a position). Searching for such a position is carried out by examining the error pattern word and the contents of the difference register 118. If and when the position is located, then the value of the digit in the corresponding position of the master key word will give the overall word comparison result as discussed above. If no such position can be determined from the *m*-digit error pattern word and the contents of the register 118 (either because the words do not differ in any other position and no more errors are detected or because all subsequent differing positions indicated in the difference register 118 are also erroneous and all erroneous positions also have differing digits), then the contents of the flip-flops 124 determine the word comparison result. This is because the flip-flops 124 will contain the results of comparing the digits in position $P_2$ -- the differing digit position next following the *m*-digit span which commences with position $P_1$. It would be assumed that position $P_2$ is not in error, since it is outside the correctable burst span of *m* digits, and thus $P_2$ would meet the requirement of being a position having differing digits but not being in error. The details of operation of the FIGS. 1A and 1B will now be given.

The comparison operation of the FIGS. 1A and 1B apparatus is initiated by the controller 110 applying a signal to the storage device 102 and also applying a "1" signal to an AND gate 116. The storage device 102 then signals the clock 106 that it is about to commence applying a data key word to the EXCLUSIVE-OR gate 114. The clock 106, in turn, will apply synchronizing signals via link C to the other units of the apparatus to enable the apparatus to operate in a synchronous mode.

The controller 110 and the storage device 102 simultaneously apply corresponding bits of a master key word and a data key word respectively to the EXCLUSIVE-OR gate 114. The data key word includes more digits since, as indicated earlier, it will have been encoded in an *m*-bit-burst error correcting code, whereas the master key word will not have been so encoded. Thus, the master key word will be compared with the information portion only of the data key word. The master key word supplied by the controller 110 is also applied to and stored in the buffer register 128.

The EXCLUSIVE-OR gate 114 compares each pair of corresponding bits of the data key word and the master key word and applies the result of such comparison to AND gate 116. Specifically, the EXCLUSIVE-OR gate 114 applies a "1" signal to AND gate 116 if the respective pair of bits do not match and applies a "0" signal if the respective pair of bits occurence of the first mismatch between a pair of bits (in position $P_1$), a "1" is applied via AND gate 116 (which was enabled by the "1" signal from the controller 110) to the M-stage difference register 118. At this time, the register 118 contains all "0's" and therefore the last stage of the register is applying a "0" signal to an inverter 120 which inverts the signal to a "1" signal for application to the input or left end of the register 118. The coincidence of this "1" signal with the "1" signal from AND gate 116 causes the registration of a "1" signal in the first stage of register 118. The contents of the register 118 are then shifted one bit position to the right with the application of each succeeding pair of bits to the EXCLUSIVE-OR gate 114 until the initially registered "1" signal reaches the last or rightmost bit position of the register 118. When the "1" signal reaches the rightmost position, it is applied to the inverter 120 which inverts the signal to a "0" signal for application to the input end of the register 118. This "0" signal inhibits further shifting of the difference register 118 for the remainder of the comparison between the data key word and the master key word.

The "1" signal generated by the EXCLUSIVE-OR gate 114 for the first mismatch is also applied via AND gate 116 to an AND gate 121 of FIG. 1B. Since the flip-flops 122 are both in the reset condition, "0" signals are being applied by both flip-flops of flip-flops 122 via an OR gate 123 to an inverter 125 which inverts the signals to a "1" signal for application to AND gate 121. The "1" signals from the inverter 125 and from the AND gate 116 cause the AND gate 121 to apply a "1" signal to AND gates 127 and 129. One of the AND gates 127 or 129 then applies a "1" signal to the corresponding flip-flop of flip-flops 122 depending on the value of that bit in the data key word giving rise to the mismatch, thereby storing the result $R_1$ of the comparison of the first mismatching bits. Specifically, if this bit of the data key word is a "1," then since the bit is applied by the storage device 102 to AND gate 127 simultaneously with the application thereto of the "1" signal from AND gate 121, AND gate 127 causes the left flip-flop of flip-flops 122 to set. On the other hand, if this bit of the data key word is a "0," then it is inverted by an inverter 131 to a "1" for application to AND gate 129. AND gate 129 would then set the right flip-flop of flip-flops 122. Setting the left flip-flop indicates that the data key word bit giving rise to the mismatch is greater than the corresponding master key word bit. Setting the right flip-flop indicates that the master key word bit giving rise to the first mismatch is greater than the corresponding data key word bit. Setting either flip-flop causes a "1" signal to be applied via OR gate 123 to the inverter 125 which inverts the signal to a "0" signal for application to the AND gate 121. This disables the AND gate 121 so that any "1" signals resulting from future mismatches will not affect the flip-flops 122.

The "1" signal supplied by AND gate 121 is also applied to AND gate 144 enabling the gates 144 to transfer the contents of a bit counter 142 to a position register 146. The bit counter 142 maintains a count of each pair of bits compared and when this count is applied to the position register 146 for storage in response to the occurrence of the first mismatch (as indicated by the "1" signal from AND gate 121), the count identifies the position $P_1$ of the first mismatching bits. Use of this information will be discussed later.

As indicated earlier, after *m*–1 shifts of the difference register 118 of FIG. 1A following the occurrence of the first mismatch, the "1" signal indicating such mismatch is stored in the rightmost position of the register 118. This "1" signal is then applied to an AND gate 133 of FIG. 1B so that the next following mismatch (occurring in position $P_2$) resulting in a "1" signal being applied via AND gate 116 to AND gate 133 will cause AND gate 133 to apply a "1" signal to AND gates 135 and 137. The result $R_2$ of comparing the digits in this next mismatching position $P_2$ will then be registered in flip-flops 124 in the same manner that $R_1$ was registered in flip-flops 122. Thus, after the data key word and the master key word have been compared, flip-flop 122 will store the result of comparing the bits in the first mismatching bit position $P_1$ and the flip-flops 124 will store the result of comparing the bits in position $P_2$, the next mismatching position following position $P_1+M-1$.

While registration of the above comparison results is taking place, the data key word is also being applied by the storage device 102 to the decoder unit 132. An example of an illustrative decoder unit which might be utilized as unit 132 is shown on page 195 of the aforecited Peterson text. After the data key word has been applied to the decoder unit 132, the unit decodes the word and generates therefor either an error location indication and an error pattern word or a "no error" indication.

The rightmost bit position of typical error patterns may contain either a "1," indicating that the corresponding bit in the error burst is erroneous, or a "0," indicating that the corresponding bit is correct. For reasons that will be clear later, it is desirable, for the apparatus of FIGS. 1A and 1B, that the bits in the error pattern word be shifted until the rightmost position contains a "1." It is also desirable that this rightmost position relate to the rightmost position of the buffer register 128. In order to accomplish this, the controller 110 simply signals the decoder to shift the error pattern word until a "1" is detected in the rightmost position thereof. As this shifting is taking place, the error location identification is incremented once for each shift to reflect the new digit positions in the data key word to which the bits in the "shifted" error pattern word correspond. Similarly, the controller 110 causes the contents of the buffer register 128 to shift to the right (with the rightmost bit being fed back to the input of the register via the feedback lead) an amount determined by the error location identification so that the bit in the rightmost position of the buffer register corresponds in position to the rightmost bit of the error pattern word.

After decoding the data key word and performing any required shifting of the error pattern word as discussed above (assuming an error has occurred), the error location indication which identifies the first erroneous digit position $E_1$, is applied by the decoder unit 132 to a location comparitor 150. The contents of the position register 146, which identifies the first position $P_1$ in which the data key word and the master key word differ, are also applied to the location comparitor 150. The error pattern word and the contents of the difference register 118 are also both applied to an error/difference comparitor 136 by the decoding unit 132 and the difference register 118 respectively. After completing the above operations, the outcome of the word comparison may be determined.

If the first of the five possible conditions discussed earlier exists (no error detected in the data key word), then the contents of flip-flops 122 determine the outcome of the word comparison. In this case, the decoder unit 132 applies a "1" signal via link A to an OR gate 156, indicating no error was detected. This "1" signal is, in turn, applied to AND gates 168 thereby enabling the contents of flip-flops 122 to be applied to OR gate 174, 176 or 178. If the data key word is greater than the master key word, then a signal will be applied to OR gate 174 and from there via lead 182 to the controller 110. If the data key word is less than the master key word, then a signal will be applied to OR gate 176 and then via lead 186 to the controller 110. Finally, if the data key word and the master key word are equal, a signal will be applied to OR gate 178 and then via lead 190 to the controller 110.

If the second of the five possible conditions exists (the first erroneous position in the data key word follows the position $P_1$ of the first detected difference), then the contents of flip-flops 122 again determine the outcome of the word comparison. For this condition, the location comparitor 150, upon determining that the error location indication EL, received from the decoder unit 132, is greater than, i.e., follows, the first detected difference position, received from the position register 146, applies a "1" signal via OR gate 156 to AND gates 168. As before, this signal causes AND gates 168 to apply the contents of the flip-flops 122 to the appropriate OR gate 174, 176, or 178.

If the third of the five possible conditions exists (the first erroneous position in the data key word precedes the first detected difference position $P_1$), then the digit in the master key word stored in the buffer register 128 corresponding in position to the first erroneous digit position of the key data word determines the word comparison result. Recall that the digit in the rightmost position of the buffer register 128 corresponds in position to the rightmost bit of the error pattern word, i.e., to the first digit position in error. Thus, this digit in the rightmost position of the buffer register 128 will determine the overall word comparison outcome. Accordingly, the location comparitor 150, upon determining that the error location indication EL is less than the contents of the position register 146, applies a "1" signal to AND gates 162 and 166. If a "1" signal is stored in the rightmost position of the buffer register 128, this signal will be applied via the AND gate 162 and the OR gate 176 to the controller 110 indicating that the data key word is less than the master key word. If, on the other hand, a "0" signal is stored in the rightmost position of the buffer register 128, the signal is inverted by an inverter 164 to a "1" signal which is applied to the AND gate 166. The AND gate 166 then applies a "1" signal via the OR gate 174 to the controller 110 indicating that the data key word is greater than the master key word.

If the fourth possible condition exists (an error is detected in the data key word but no differences are detected), then the location comparitor 150 applies a "1" signal to AND gates 162 and 166 and the FIGS. 1A and 1B apparatus operates the same as under condition 3.

If the fifth and last of the possible conditions exists (the first erroneous position in the data key word coincides with the first difference position $P_1$, then, as indicated earlier, it is necessary to examine the M-1 positions following position $P_1$ to determine if there is a position in error not having differing digits or if there is a position having differing digits but not being in error. If a next such position is located, then the value of the digit in the corresponding position of the master key word will determine the overall word comparison result. If no such position is found, then the contents of the flip-flops 124 determine the word comparison result. When condition five exists, the location comparator 150 applies a "1" signal to the error/difference comparitor 136 indicating that the error location indication received from the decoder unit 132 and the contents of the position register 146 are equal. The error/difference comparitor 136 then commences to compare the error pattern word and the contents of the difference register 118 bit by bit beginning with the right most bits. While each such pair of bits are compared, the contents of the buffer register 128 are shifted one bit position to the right so that the digit in the rightmost position of the buffer register 128 will correspond in position to the position of the pair of bits being compared by the comparitor 136. As long as the bits being compared match, the comparitor 136 applies a "1" signal to an AND gate 158 and to an inverter 152. If a mismatch occurs, a "0" signal is applied to the inverter 152 which inverts the signal to a "1" signal and applies it to AND gates 167 and 169. The "1" signal applied by the location comparitor 150 to the error/difference comparitor 136 is also applied to AND gates 167 and 169. If, when the mismatch occurs, the digit in the rightmost position of the buffer register 128 is a "1" signal, this signal is applied via AND gate 169 and OR gate 176 to the controller 110 indicating that the data key word is less than the master key word. If the digit stored in the rightmost position of the buffer register 128 is a "0" signal, it is inverted by the inverter 164 to a "1" signal which is then applied via AND gate 167 and OR gate 174 to the controller 110 indicating that the data key word is greater than the master key word.

If no mismatches have occurred between the error pattern word and the contents of the difference register 118 up to the time the last pair of bits are being compared, then the controller 110 applies a "1" signal via link B to the AND gate 158 of FIG. 1B. This signal, in conjunction with a "1" signal from the comparitor 136 indicating that the last pair of bits match, causes the AND gate 158 to apply a "1" signal to AND gates 172 thereby gating the contents of the flip-flops 124 to the comparitor 110. Thus, if the data key word bit in position $P_2$ is greater than the corresponding master key word bit, indicated by the left flip-flop of flip-flops 124 being in the set condition, then a "1" signal would be applied via the leftmost AND gate of AND gates 172 and the OR gate 174 to the controller 110 indicating that the data key word is greater than the master key word. If, on the other hand, the data key word bit in position $P_2$ is less than the corresponding master key word bit, indicated by the right flip-flop of flip-flops 124 being in the set condition, then a "1" signal would be applied via the middle AND gate of AND gates 172 and the OR gate 176 to the controller 110 indicating that the data keyword is less than the master key word. Finally, if there were no differing bit positions following position $P_1 + M-1$, then flip-flops 124 would have remained in the reset condition resulting in a "1" signal being applied by the rightmost AND gate of AND gates 172 via OR gate 178 to the controller 110 indicating that the data key word and the master key word are equal.

After completion of the comparison of a data key word with a master key word and the generation of the appropriate signal indicating the result of such comparison, the controller 110 initializes the various units of the FIGS. 1A and 1B apparatus by resetting all flip-flops, clearing the registers, and resetting the counter 142. The apparatus is then ready to perform another comparison.

In response to the signal on lead 182, 186 or 190, indicating the result of the comparison, the controller 110 takes appropriate action with respect to information in the storage device 102 associated with the data key word compared.

It is understood that the above-described arrangement is only illustrative of the application of the principles of the present invention. Numerous modifications and alternative arrangements may be devised by those skilled in the art without departing from the spirit and scope of the invention. It is clear, for example, that the operations performed by the FIGS. 1A and 1B apparatus could also be performed on an appropriately programmed general purpose computer. Furthermore, the apparatus of FIGS. 1A and 1B could be modified so that as soon as a determination was made that the first erroneous digit position followed the first position having differing digits, the decoding process could be immediately discontinued since the digits in the first differing digit position would provide all the information necessary to determine the outcome of the data key word and the master key word comparison. This, of course, would save some time in the overall comparison operation.

What is claimed is:

1. Apparatus for providing error control for information comparison comprising
   - storage means for storing a data key word encoded in an *m*-bit-burst error correcting code,
   - means for comparing the information portion of said data key word retrieved from said first storage means with an externally supplied master key word,
   - means for decoding said data key word,
   - means responsive to said decoding means for determining a first condition that no error is detected in said data key word, if such condition exists,
   - means responsive to said comparing means and said decoding means for determining a second condition that the most significant digit position $E_1$ of said data key word which is detected as being in error follows, in descending order of digit significance, the most significant digit position $P_1$ in which said data key word and said master key word differ, if such second condition exists,
   - an output circuit, and
   - means responsive to said comparing means and to either said first condition or said second condition for applying a signal to said output circuit indicating whether the value of the data key word bit in position $P_1$ is greater than, equal to, or less than the value of the corresponding bit in the master key word, thereby indicating that the data key word is respectively greater than, equal to, or less than the master key word.

2. Apparatus as in claim 1 further comprising means responsive to said comparing means and said decoding means for determining a third condition that position $P_1$ follows, in descending order of digit significance, the position $E_1$, if such third condition exists, means responsive to said comparing means and to said decoding means for determining a fourth condition that an error is detected in position $E_1$ of said data key word but no differences between said data key word and said master key word are detected, if such fourth condition exists, means responsive to the presence of a logical "1" in the master key word position corresponding to position $E_1$ and to either said third condition or said fourth condition for applying a signal to said output circuit indicating that said data key word is less than said master key word, and means responsive to the presence of a logical "0" in the master key word position corresponding to position $E_1$ and to either said third condition or said fourth condition for applying a signal to said output circuit indicating that said data key word is greater than said master key word.

3. Apparatus as in claim 2 further comprising means responsive to said comparing means and said decoding means for determining a fifth condition that the position $E_1$ coincides with the position $P_1$, if such fifth condition exists, means responsive to said comparing means, said decoding means, and said fifth condition for locating the next position $P_i$ among the M–1 positions following position $P_1$ in descending order of digit significance in which either said data key word and said master key word differ and no error has occurred or said data key word and said master key word match and an error has occurred, if such a position $P_i$ exists, means responsive to said fifth condition, to the locating of position $P_i$, and to the presence of a logical "1" in the master key word position corresponding to position $P_i$ for applying a signal to said output circuit indicating that said data key word is less than said master key word, and means responsive to said fifth condition, to the locating of position $P_i$, and to the presence of a logical "0" in the master key word position corresponding to position $P_i$ for applying a signal to said output circuit indicating said data key word is greater than said master key word.

4. Apparatus as in claim 3 further comprising means responsive to said fifth condition and to a failure to locate position $P_i$ for applying a signal to said output circuit indicating whether the value of the data key word bit in position $P_2$ — the position next following the position $P_1+M–1$ in descending order of digit significance in which said data key word and said master key word differ — is greater than, equal to, or less than the value of the corresponding bit in said master key word, whereby indicating that the data key word is respectively greater than, equal to, or less than said master key word.

5. Apparatus for providing error control for information comparison comprising first storage means for storing a data key word encoded in an m-bit-burst error correcting code, first comparing means for comparing the information position of said data key word retrieved from said first storage means with an externally supplied master key word, second storage means responsive to said first comparing means for storing the identity of the most significant digit position $P_1$ in which said data key word and said master key word differ if any, third storage means responsive to said first comparing means for storing an indication $R_1$ of whether the value of the data key word bit in position $P_1$ is greater than, equal to, or less than the value of the corresponding bit in the master key word, a decoder connected to said first storage device for decoding said data key word to generate therefrom either an indication of the most significant digit position $E_1$ of said data key word which is in error and an error pattern word or an indication that no error is present in said data key word, second comparing means responsive to said decoder and said second storage means for generating a first signal if $E_1 > P_1$, indicating that $E_1$ follows $P_1$ in position, reading in descending order of digit significance, for generating a second signal if $E_1 < P_1$, indicating that $E_1$ precedes $P_1$ in position, and for generating a third signal if $E_1 = P_1$, indicating that $E_1$ corresponds in position to $P_1$, an output circuit, and means responsive either to an indication of no error from said decoder or to said first signal for applying $R_1$ to said output circuit, thereby indicating that said data key word is greater than, equal to, or less than said master key word if the data key word bit in position $P_1$ is respectively greater than, equal to, or less than the corresponding bit in said master key word.

6. Apparatus as in claim 5 further comprising fourth storage means for storing said master key words, means responsive to said second signal and to the presence of a logical "1" in the master key word position corresponding to position $E_1$ for applying a signal to said output circuit indicating that said data key word is less than said master key word, and means responsive to said second signal and to the presence of a logical "0" in the master key word position corresponding to position $E_1$ for applying a signal to said output circuit indicating that said data key word is greater than said master key word.

7. Apparatus as in claim 6 further comprising fifth storage means responsive to said first comparing means for storing indications of those digit positions of the M–1 digit positions next following position $P_1$ in descending order of digit significance in which said data key word and said master key word differ, means responsive to said decoder and to said fifth storage means for locating the next position $P_i$ among the M–1 positions following position $P_1$ in descending order of digit significance in which either said data key word and said master key word differ and no error has occurred or said data key word and said master key word match and an error has occurred, if such a position $P_i$ exists, means responsive to the locating of position $P_i$ and to the presence of a logical "1" in the master key word position corresponding to position $P_i$ for applying a signal to said output circuit indicating that said data key word is less than said master key word, and means responsive to the locating of position $P_i$ and to the presence of a logical "0" in the master key word position corresponding to position $P_i$ for applying a signal to said output circuit indicating that said data key word is greater than said master key word.

8. Apparatus as in claim 7 further comprising sixth storage means responsive to said first comparing means for storing an indication $R_2$ of whether the value of the data key word bit in position $P_2$ — the position next following the position $P_1 + M-1$ in descending order of digit significance in which said data key word and said master key word differ — is greater than, equal to, or less than the value of the corresponding bit in said master key word, and means responsive to a failure to locate position $P_i$ for applying $R_2$ to said output circuit, thereby indicating that said data key word is greater than, equal to, or less than said master key word if the data key word bit in position $P_2$ is respectively greater than, equal to, or less than the corresponding bit in said master key word.

* * * * *